(12) United States Patent
Souma

(10) Patent No.: US 10,095,221 B2
(45) Date of Patent: Oct. 9, 2018

(54) NUMERICAL CONTROLLER FOR NOTIFYING EXECUTION OF AUXILIARY FUNCTION IN ADVANCE

(71) Applicant: FANUC Corporation, Yamanashi (JP)

(72) Inventor: Daisaku Souma, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 286 days.

(21) Appl. No.: 15/196,118

(22) Filed: Jun. 29, 2016

(65) Prior Publication Data

US 2017/0003673 A1 Jan. 5, 2017

(30) Foreign Application Priority Data

Jun. 30, 2015 (JP) .................................. 2015-131423

(51) Int. Cl.
*G05B 19/4155* (2006.01)
(52) U.S. Cl.
CPC ............... *G05B 19/4155* (2013.01); *G05B 2219/34347* (2013.01)
(58) Field of Classification Search
None
See application file for complete search history.

(56) References Cited

U.S. PATENT DOCUMENTS

2006/0239386 A1  10/2006  Endo et al.

FOREIGN PATENT DOCUMENTS

| JP | 4-177404 A | 6/1992 |
| JP | 5-63749 U | 8/1993 |
| JP | 3-282318 | 10/1994 |
| JP | 11-110018 A | 4/1999 |
| JP | 2006-301930 A | 11/2006 |
| JP | 2007-025945 A | 2/2007 |
| JP | 2009-098981 A | 5/2009 |
| JP | 2010-033150 A | 2/2010 |
| JP | 2012-141762 A | 7/2012 |

OTHER PUBLICATIONS

Decision to Grant a Patent in JP Application No. 2015-131423, dated Aug. 29, 2017, 6pp.

*Primary Examiner* — Mohammad Ali
*Assistant Examiner* — Saad M Kabir
(74) *Attorney, Agent, or Firm* — Hauptman Ham, LLP

(57) ABSTRACT

A numerical controller for controlling execution of an auxiliary function of a machine calculates an amount of time before execution of an auxiliary function included in a program, and calculates a leading operation initiation time of each of operations of an auxiliary function on the basis of the calculated time and a lead time (stored time) of each of the operations. The numerical controller outputs, to the machine, a command for executing each of the operations of the auxiliary function, according to the leading operation initiation time.

1 Claim, 5 Drawing Sheets

FIG. 2
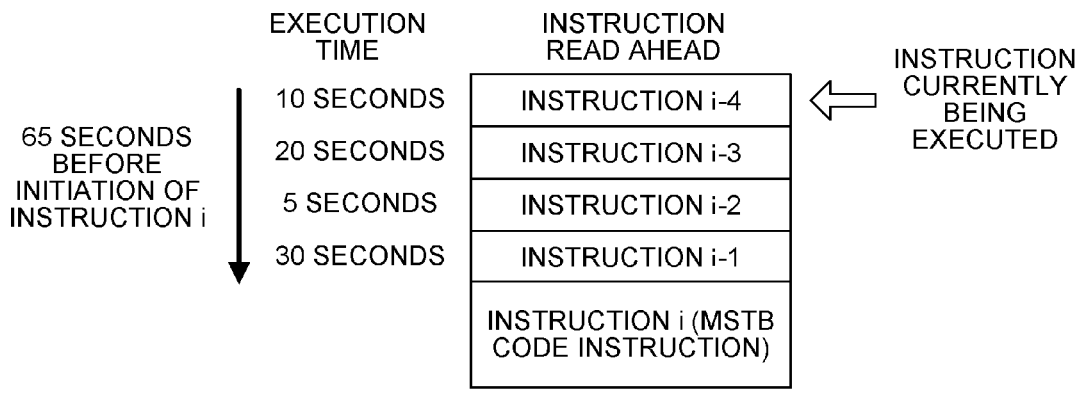
FIG. 3
| MSTB CODE | OPERATION 1 | | OPERATION 2 | | |
|---|---|---|---|---|---|
| | ADDRESS | LEAD TIME | ADDRESS | LEAD TIME | ... |
| Txx | TCHG1 | 10 SECONDS | TCHG2 | 0 SECOND | ... |
| M08 | OILM1 | 30 SECONDS | OILM2 | 1 SECOND | ... |
| M03 | SPNDL1 | 0 SECOND | — | — | ... |
| ... | ... | ... | ... | ... | ... |
FIG. 4
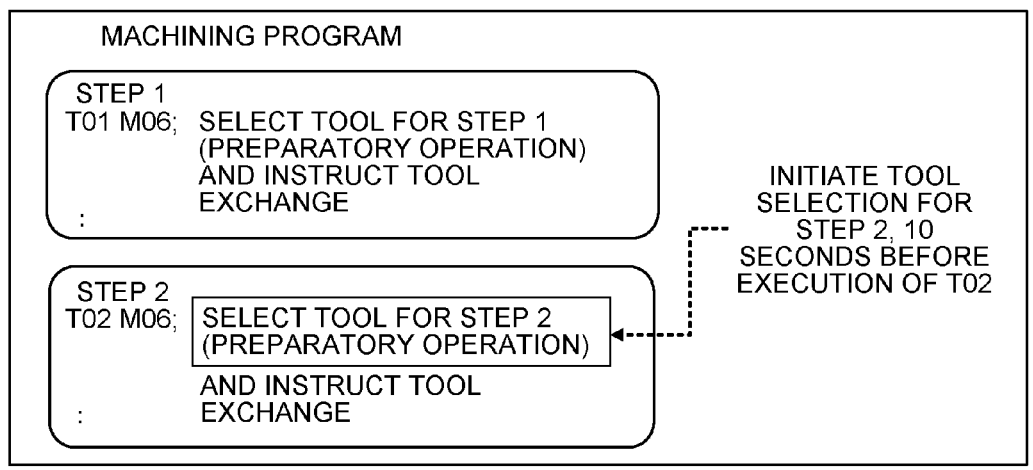

NUMERICAL CONTROLLER FOR NOTIFYING EXECUTION OF AUXILIARY FUNCTION IN ADVANCE

RELATED APPLICATIONS

The present application claims priority to Japanese Application Number 2015-131423, filed Jun. 30, 2015, the disclosure of which is hereby incorporated by reference herein in its entirety.

BACKGROUND OF THE INVENTION

Field of the Invention

The present invention relates to a numerical controller, and particularly to a numerical controller that allows a single auxiliary function (MSTB code: generic name for M code, S code, T code, and B code) to be executed at multiple timings.

Description of the Related Art

An auxiliary function is provided as an instruction for turning on and off devices, selecting tools, and controlling the number of rotations of a spindle, for example, on the machine side. When an auxiliary function is instructed, a code signal, a strobe signal, and a completion signal are sequentially exchanged between a numerical controller and the machine. While the machine side performs various operations between receipt of the code signal and strobe signal, and returning of the completion signal, some of the operations (preparatory operation) can be performed in advance. However, the current structure does not allow operations including the preparatory operation on the machine side to be initiated, until a block of an auxiliary function is executed. This indicates that time is wasted for the execution time of the preparatory operation.

As a solution to the above problem, there is a method to instruct only the preparatory operation part in advance. For example, FIG. 7A shows an example of a general program, in which instructions are executed sequentially with the preparatory operation not executed in advance. In FIG. 7A, "Txx (xx indicates a numerical value)" is a tool preparation instruction, and "M06" is a tool exchange instruction. Here, the tool preparation instruction can be executed (prepared), before actually exchanging tools according to the tool exchange instruction.

Hence, by giving the tool preparation instruction "Txx (xx indicates a numerical value)" beforehand in the step before the step of executing the tool exchange instruction, as shown in FIG. 7B, the time loss caused by the execution time of the preparatory operation can be eliminated to some extent. However, this method requires the preparatory operation instruction to be included in the machining program of the previous step, which causes other problems, such as complication of the machining program, and increase in the modification amount of the machining program when interchanging the steps.

As a solution taking into account these other problems, there is a method (see Japanese Patent Application Laid-Open No. 2010-33150, for example) that allows an independently executable auxiliary function, such as tool preparation, to be executed earlier than the machining program command. This is achieved by providing a controller (second machining program analysis unit and other parts) for analyzing and executing only the auxiliary function, in addition to a controller (first machining program analysis unit and other parts) for performing main analysis and execution. Note that in this conventional technique, an auxiliary function that can be executed independently, such as tool preparation, is referred to as an "independent auxiliary function" and, conversely, an auxiliary function that cannot be executed independently, such as tool exchange, is referred to as a "dependent auxiliary function."

By adopting the method described in aforementioned Japanese Patent Application Laid-Open No. 2010-33150, the independent auxiliary function command of step 2 can be analyzed and executed beforehand in step 1 as in the timing chart of FIG. 8B, without moving the position of the independent auxiliary function command in the program as in FIG. 8A. However, use of the method described in Japanese Patent Application Laid-Open No. 2010-33150 just allows the control unit for analyzing and executing only the auxiliary function to execute the auxiliary function earlier than the program command, and the execution timing depends on the control unit. Hence, the auxiliary function cannot always be executed at an appropriate timing on the machine side.

For example, when performing tool preparation on the first path side of a dual-path machine, simply initiating the execution early is not appropriate, when the second path side is in the middle of processing and influence of vibration needs to be considered even though early initiation of tool preparation is desired, or when a consumable is used and waste needs to be avoided.

Also, both methods of the conventional techniques require the target program to be separated beforehand into an independent auxiliary function such as "Txx (tool preparation instruction)," and a dependent auxiliary function such as "M06 (tool exchange instruction)." Accordingly, the conventional techniques are not applicable to a case of instructing multiple operations by an auxiliary function command, which is originally a single instruction.

SUMMARY OF THE INVENTION

In view of the foregoing, an objective of the present invention is to provide a numerical controller that allows a single auxiliary function to be executed at multiple timings.

A numerical controller of the present invention is a numerical controller for controlling execution of an auxiliary function of a machine according to a program, and includes: a command analysis unit configured to perform a read ahead of a block of the program and analyze an instruction of the block; an auxiliary function operation information storage unit configured to store auxiliary function operation information, in which a code for instructing an auxiliary function, at least one operation of the auxiliary function, and a lead time of the operation are associated with one another; an execution initiation timing notification unit configured to, when the code for instructing the auxiliary function is included in the block read ahead by the command analysis unit, calculate the amount of time before execution of the code for instructing the auxiliary function on the basis of the block read ahead by the command analysis unit, and output the calculated time and the code for instructing the auxiliary function; and an execution timing determination unit configured to acquire auxiliary function operation information corresponding to the code for instructing the auxiliary function from the auxiliary function operation information storage unit, on the basis of the code for instructing the auxiliary function outputted from the execution initiation timing notification unit, calculate a leading operation initiation time of an operation included in the acquired auxiliary function operation information, on the basis of a lead time of the operation included in the auxiliary function operation information, and the amount of time before execution of the code for instructing the auxiliary function outputted from the execution initiation timing notification unit, and execute the operation of the auxiliary function according to the leading operation initiation time. Then, the numerical controller outputs, to the machine, a command for executing the operation of the auxiliary function determined by the execution timing determination unit.

The present invention allows an auxiliary function including multiple operations to be executed at an appropriate timing, without modifying the code. Hence, specific operation adjustments can be made according to the machine configuration or program, and cycle time can be reduced, for example.

BRIEF DESCRIPTION OF THE DRAWINGS

The aforementioned and other objectives and characteristics of the present invention will be clarified, by the following description of embodiment with reference to the accompanying drawings. Of the drawings.

FIG. 2 is a diagram describing a method for calculating the amount of time before execution of an auxiliary function, by the numerical controller of FIG. 1;

FIG. 3 is a table showing an example of auxiliary function operation information stored in an auxiliary function operation information storage unit of a programmable controller of the numerical controller of FIG. 1;

FIG. 4 is a diagram showing an example of a program for executing a tool exchange auxiliary function, by the numerical controller of FIG. 1;

DETAILED DESCRIPTION OF THE PREFERRED EMBODIMENTS

The present invention notifies the machine side of the amount of time before execution of an auxiliary function to thereby allow the machine side to execute an operation corresponding to the auxiliary function at an appropriate timing, without modifying a machining program. Thus, a numerical controller is provided which allows a single auxiliary function to be executed at multiple timings.

Figure 1:
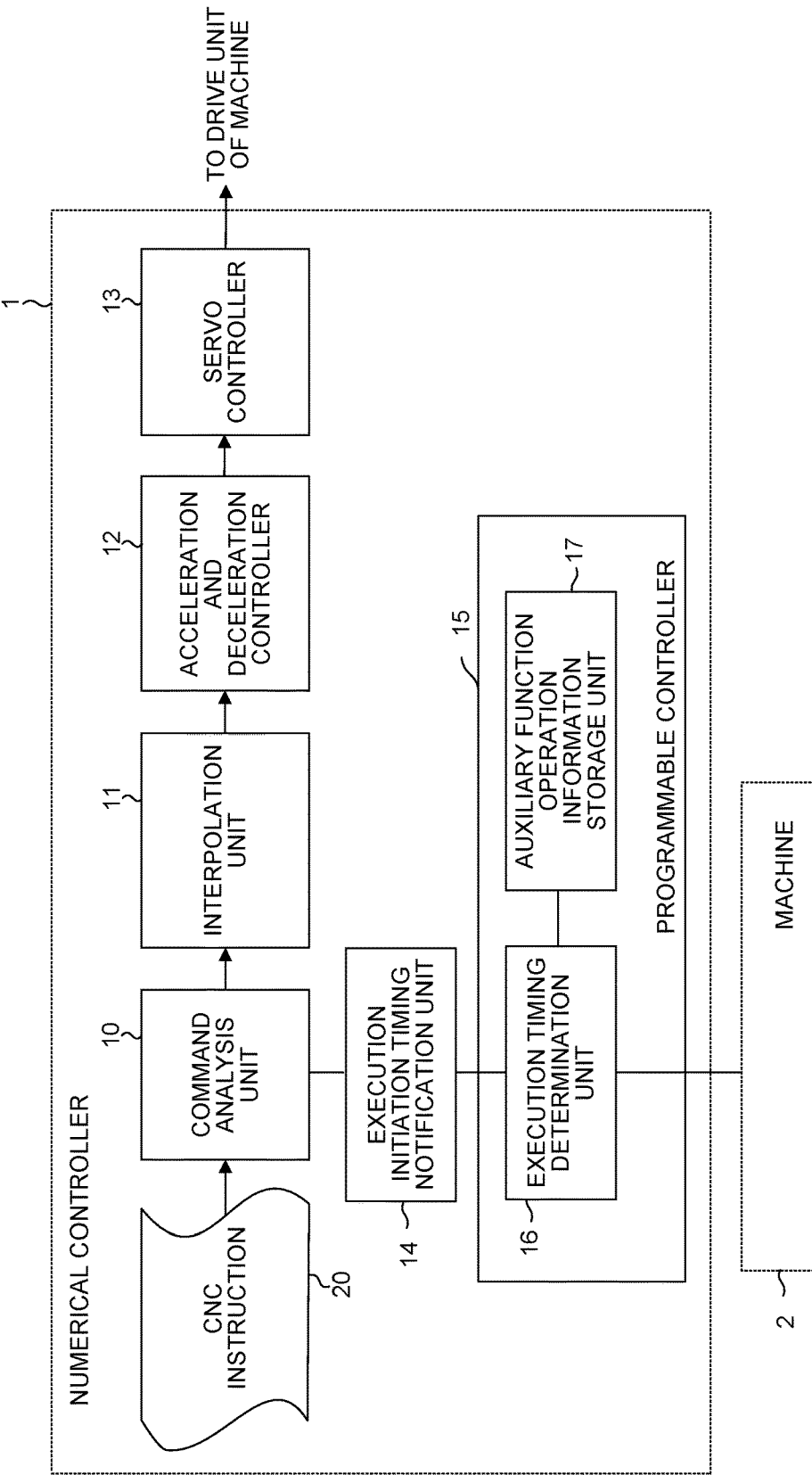
FIG. 1 is a functional block diagram of a system, which is formed of a machine and a numerical controller of an embodiment of the present invention.

FIG. 1 is a functional block diagram of a system, which is formed of a machine and a numerical controller of an embodiment of the present invention.

The system of FIG. 1 is configured of a numerical controller 1 and at least one machine 2. Note that although an embodiment will be described below by using an MSTB code as an example of a code for instructing execution of an auxiliary function, functions of the present invention are also applicable to codes for instructing execution of an auxiliary function other than the MSTB code.

The numerical controller 1 includes a command analysis unit 10, an interpolation unit 11, an acceleration and deceleration controller 12, a servo controller 13, an execution initiation timing notification unit 14, and a programmable controller 15.

The command analysis unit 10 performs a read ahead and analysis of a CNC instruction 20 from a program stored in a memory (not shown), for example, and if it is a normal instruction for controlling a drive unit of a machine, generates travel instruction data on the basis of an analysis result, and outputs the generated travel instruction data to the interpolation unit 11.

The interpolation unit 11 generates data by calculating points on an instructed path by interpolation for every interpolation cycle, on the basis of a travel instruction given by the travel instruction data outputted from the command analysis unit 10.

The acceleration and deceleration controller 12 calculates the speed of each drive axis for every interpolation cycle, by performing acceleration and deceleration processing based on the interpolation data outputted from the interpolation unit 11, and outputs the calculated data to the servo controller 13.

Then, the servo controller 13 controls each of the drive units of the machine, on the basis of the output of the acceleration and deceleration controller 12.

On the other hand, when an MSTB code instruction for instructing execution of an auxiliary function is included in the CNC instruction 20 read ahead, the command analysis unit 10 outputs the instruction read ahead to the execution initiation timing notification unit 14, and also instructs the execution initiation timing notification unit 14 to send the programmable controller 15 a notification regarding the MSTB code instruction for instructing the auxiliary function.

When given the instruction for sending a notification regarding the MSTB code instruction by the command analysis unit 10, the execution initiation timing notification unit 14 analyzes the instruction read ahead by the command analysis unit 10, to calculate the execution time of each instruction and add up the results. Thus, the execution initiation timing notification unit 14 calculates the amount of time before execution of the MSTB code instruction. For example, as shown in FIG. 2, when instructions i–4 to i (MSTB code instruction) are read ahead, and instruction i–4 is currently being executed, the execution initiation timing notification unit 14 calculates the execution time of each of instructions i–4 to i–1 and accumulates the results, to thereby calculate the amount of time (65 seconds in FIG. 2) before execution of instruction i (MSTB code instruction). Note that the method of calculating the execution time of each of the instructions has become publicly known by Japanese Patent Application Laid-Open No. 2007-025945, and Japanese Patent Application Laid-Open No. 2009-098981, for example, and therefore descriptions thereof will be omitted in the specification.

Then, the execution initiation timing notification unit 14 notifies the programmable controller 15 of a signal including the MSTB code and the amount of time before execution of the MSTB code.

The programmable controller 15 receives the signal based on each instruction, for example, processes the received signal by a sequence program, and outputs a signal as an operation instruction to control a machine to be controlled, such as the machine 2. The programmable controller 15 also receives a condition signal from the machine to be controlled, such as the machine 2, and transfers an input signal necessary for processing in the numerical controller 1.

In the present invention, the programmable controller 15 includes an execution timing determination unit 16 and an auxiliary function operation information storage unit 17. The execution timing determination unit 16 and the auxiliary function operation information storage unit 17 are functional means implemented by operations based on the sequence program.

The execution timing determination unit 16 determines the execution timing of each of operations of the auxiliary function instructed by the MSTB code, on the basis of the signal including the MSTB code instruction and the amount of time before execution of the MSTB code instruction, which are received from the execution initiation timing notification unit 14, and information (auxiliary function operation information) related to each of the operations of the auxiliary function instructed by the MSTB code instruction, which is stored in the auxiliary function operation information storage unit 17. Then, the execution timing determination unit 16 outputs a signal for instructing initiation of each of the operations of the auxiliary function to the machine 2, according to the determined execution timing.

FIG. 3 is a table showing an example of auxiliary function operation information stored in the auxiliary function operation information storage unit 17 of the embodiment.

The auxiliary function operation information includes, for each auxiliary function, an MSTB code for instructing the auxiliary function, and multiple pieces of operation information related to the operation of the auxiliary function. Each piece of operation information includes a signal address to be used when executing the operation, and a lead time of execution of the operation. In the example of FIG. 3, the auxiliary function instructed by a turret (tool exchange performed only by T codes) tool preparation instruction Txx is configured of two operations, which are a tool selection operation (signal address: TCHG1) and a tool exchange operation (signal address: TCHG2). The tool selection operation has a lead time of 10 seconds (executed 10 seconds in advance), and the tool exchange operation has zero lead time (cannot be executed in advance).

Here, when the auxiliary function operation information in FIG. 3 is stored in the auxiliary function operation information storage unit 17, instruction T02 of step 2 is read ahead during execution of step 1 according to the machining program exemplified in FIG. 4, and the execution initiation timing notification unit 14 notifies the programmable controller 15 of a signal including instruction T02 and the amount of time before execution of instruction T02. Then, the execution timing determination unit 16 reads operation information on the auxiliary function instructed by the execution initiation timing notification unit 14 with the tool preparation instruction Txx, and on the basis of the lead time set for each piece of operation information included in the read auxiliary function operation information, calculates for each operation a leading operation initiation time, which is obtained by subtracting each lead time from the amount of time before execution of the tool preparation instruction Txx notified by the execution initiation timing notification unit 14. Thereafter, the execution timing determination unit 16 determines to execute each of the operations, after the elapse of each of the calculated leading operation initiation times.

Then, the programmable controller 15 notifies the machine 2 of signals instructing initiation of the respective operations, at the timing of the respective operations determined by the execution timing determination unit 16.

Figure 5:
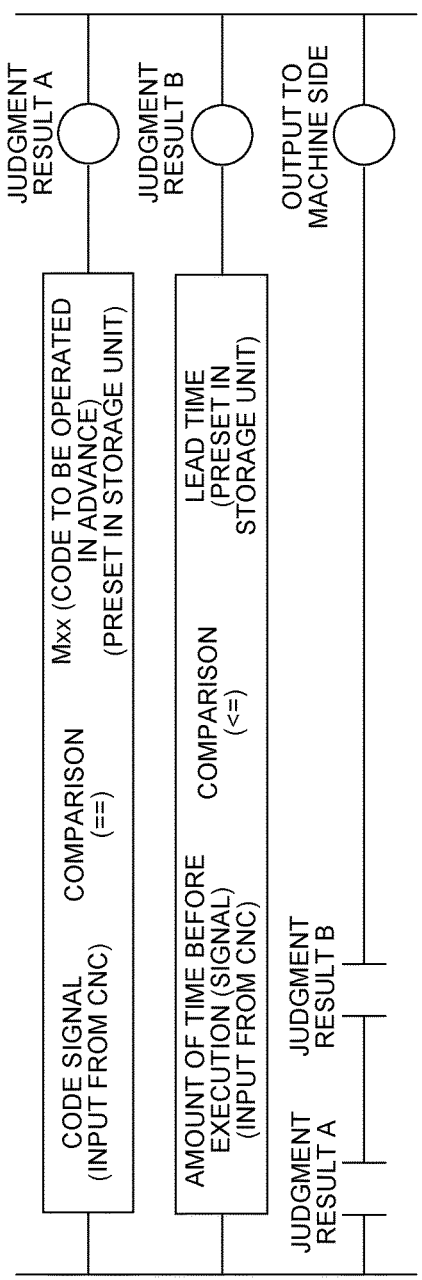
FIG. 5 is a diagram showing an example of a sequence program (ladder circuit) executed by the programmable controller (execution timing determination unit) of the numerical controller of FIG. 1.

FIG. 5 shows a simplified example of the sequence program (ladder circuit), for implementing the execution timing determination unit 16.

Assume that the programmable controller 15 receives input of a code to be operated in advance as a code signal and the amount of time before execution of the code as a signal, from the execution initiation timing notification unit 14 of the numerical controller 1 (CNC), while executing the sequence program of FIG. 5. Here, if the code coincides with the code "Mxx" to be operated in advance, and the amount of time before execution of the code is shorter than the lead time of the operation of the code, a signal for initiating the operation of the Mxx code is outputted to the machine 2 side. The execution timing determination unit 16 can be implemented by generating such a sequence program for each of the operations of the MSTB code.

Note that the calculation by the execution initiation timing notification unit 14 of the amount of time before execution of the MSTB code, based on the read ahead by the command analysis unit 10, and the processing by the execution timing determination unit 16 for determining the execution timing of each of the operations of the auxiliary function, based on the calculated time, are successively performed at least for every processing cycle of the numerical controller 1. This enables substantially real-time adjustment of signal output to the machine 2, so that changes in the amount of time before execution of the MSTB code, due to changes in execution conditions of the numerical controller 1 can be addressed.

The machine 2 is a machine to be controlled by the numerical controller 1, and includes machine tools, and peripheral devices arranged around the machine tools. Note that although multiple machines 2 are connected to the numerical controller 1 through the programmable controller 15, only a single machine 2 is shown in FIG. 1 for the sake of simplicity of the description.

The auxiliary function executed by the machine 2 is: tool selection and control of the number of rotations of the spindle, for example, if the machine 2 is a machine tool; opening and closing of mechanical doors, for example, if the machine 2 is an enclosure of a machine, which is peripheral equipment; and setting and removing of workpieces, for example, if the machine 2 is a robot. Thus, the executed auxiliary function differs depending on the type of the machine 2.

These auxiliary functions are executed when the machine 2 receives a signal outputted from the programmable controller 15.

As has been described, the present invention enables an operation that can be executed in advance, among multiple operations of each auxiliary function, to be executed earlier for the preset lead time. This not only can reduce cycle time of processing operation as in the conventional techniques, but also allows each of the operations to be executed at a selected timing before or after instruction of the operation, by setting the lead time. Hereinbelow, a description will be given of useful application examples of the numerical controller of the embodiment, other than reduction of cycle time.

Figure 6:
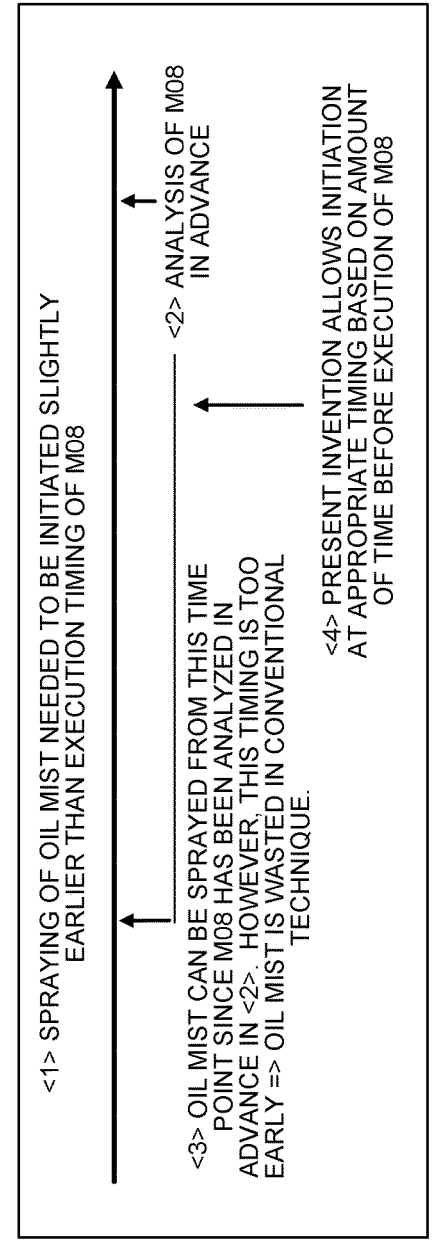
FIG. 6 is a timing chart of operations of the numerical controller according to the embodiment, when an oil mist is used.
Figure 7A:
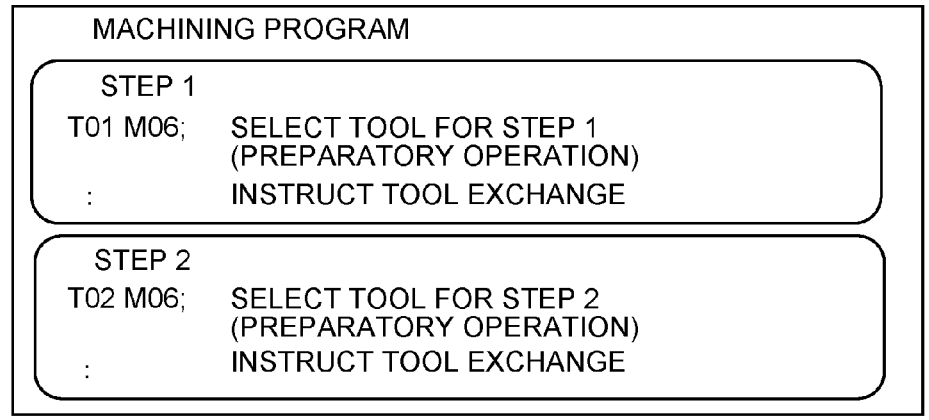
FIGS. 7A and 7B are diagrams showing examples of programs of conventional techniques for executing the tool exchange auxiliary function.
Figure 7B:
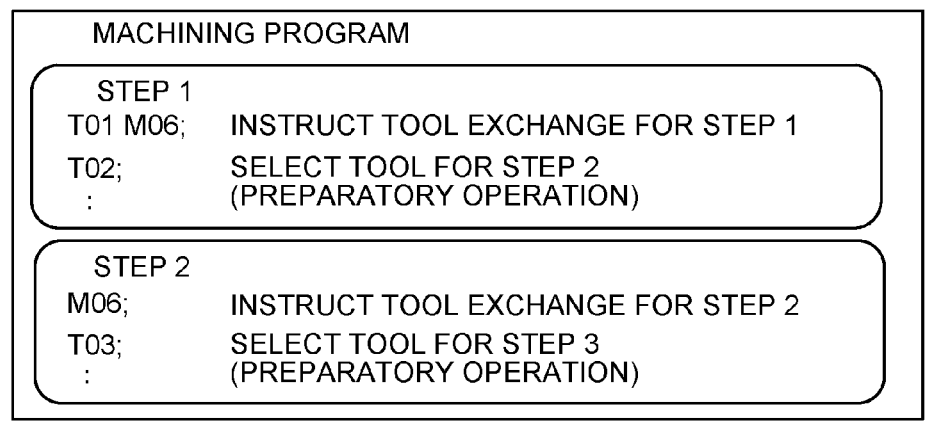
Figure 8A:
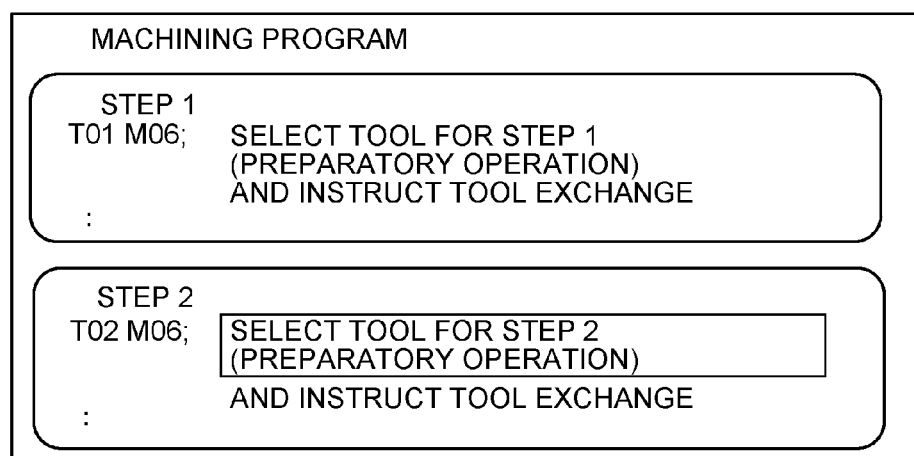
FIGS. 8A and 8B are diagrams showing an example of a program of a conventional technique for executing the tool exchange auxiliary function.
Figure 8B:
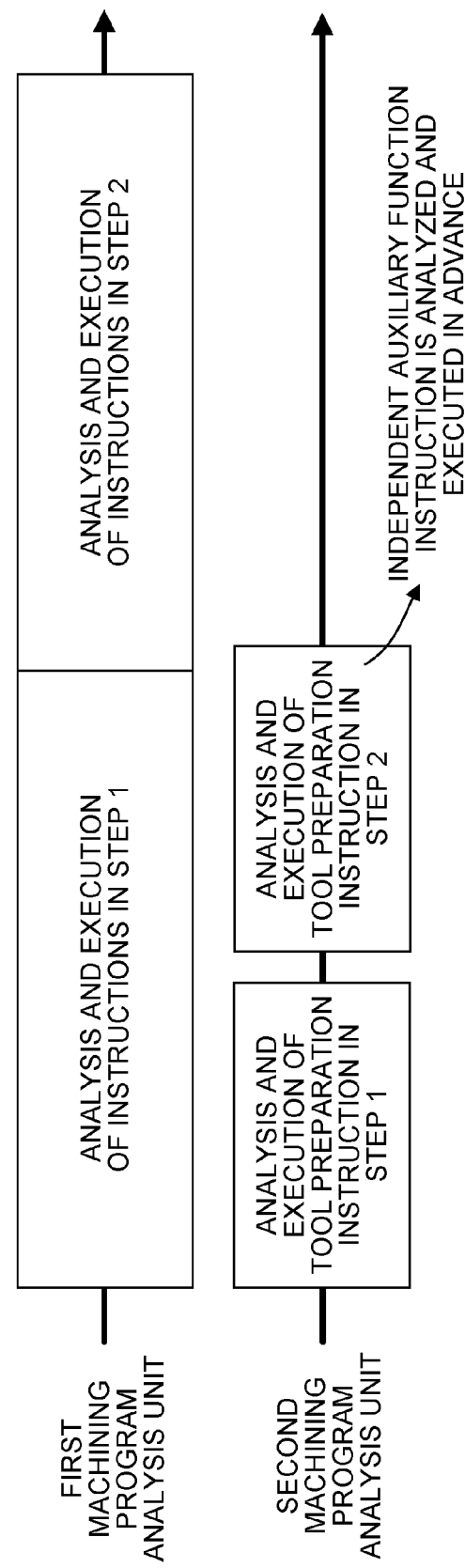

FIG. 6 is a timing chart of operations of the numerical controller of the embodiment, when an oil mist is used.

As shown in FIG. 6, during control of processing of a machine tool, when spraying of the oil mist needs to be initiated slightly earlier than the execution timing of instruction "M08" in a program (<1>), instruction "M08" is read ahead and analyzed (<2>), and is executed in advance. At this time, since the conventional techniques do not particularly consider the execution timing of the MSTB instruction, the oil mist is sprayed upon completion of the analysis, and is wasted in some cases (<3>). On the other hand, the present invention allows the oil mist to be sprayed at an appropriate timing that the user desires (<4>), by setting a short (one second in FIG. 3) lead time for the oil mist spraying operation as in FIG. 3, for example.

In addition, when performing tool preparation on the first path side of a dual-path machine, the preparation can be performed at a timing taking into account the condition on the second path side, for example. Thus, unlike the conventional techniques, the present invention can adjust an operation timing in a manner such that cycle time is reduced and an adverse effect on machining is avoided.

Although the embodiment of the present invention has been described, the invention is not limited only to the above embodiment, and may be implemented in various forms by making appropriate changes.

The invention claimed is:

1. A numerical controller for controlling execution of an auxiliary function of a machine according to a program, the numerical controller configured to:

perform a read ahead of a block of the program and analyze an instruction of the block, store auxiliary function operation information, in which a code for instructing an auxiliary function, at least one operation of the auxiliary function, and a lead time of the operation are associated with one another, when the code for instructing the auxiliary function is included in the read ahead block, calculate the amount of time before execution of the code for instructing the auxiliary function on the basis of the read ahead block, and output the calculated time and the code for instructing the auxiliary function, acquire auxiliary function operation information corresponding to the code for instructing the auxiliary function from the stored auxiliary function operation information, on the basis of the outputted code for instructing the auxiliary function, calculate a leading operation initiation time of an operation included in the acquired auxiliary function operation information, on the basis of a lead time of the operation included in the auxiliary function operation information, and the amount of time before execution of the outputted code for instructing the auxiliary function, and determine to execute the operation of the auxiliary function according to the leading operation initiation time, wherein the numerical controller outputs, to the machine, a command for executing the operation of the auxiliary function determined by the numerical controller.

* * * * *